United States Patent

Shimizu et al.

[11] Patent Number: 6,018,692
[45] Date of Patent: Jan. 25, 2000

[54] AUTOMATIC STEERING APPARATUS FOR VEHICLES

[75] Inventors: Yasuo Shimizu; Katsuhiro Sakai, both of Saitama, Japan

[73] Assignee: Honda Giken Kogyo Kabushiki Kaisha, Tokyo, Japan

[21] Appl. No.: 09/067,005

[22] Filed: Apr. 27, 1998

[30] Foreign Application Priority Data

Apr. 28, 1997 [JP] Japan .................................. 9-111214

[51] Int. Cl.⁷ .................................................. B62D 6/00
[52] U.S. Cl. ........................... 701/41; 701/70; 180/204; 180/446; 318/587
[58] Field of Search ............................. 701/23, 25, 41, 701/42, 43, 70; 180/204, 446, 167, 168, 169; 318/587

[56] References Cited

U.S. PATENT DOCUMENTS

| | | | |
|---|---|---|---|
| 4,735,274 | 4/1988 | Good et al. | 180/204 |
| 4,931,930 | 6/1990 | Shyu et al. | 180/204 |
| 5,742,141 | 4/1998 | Czekaj | 701/41 |
| 5,764,015 | 6/1998 | Shimizu et al. | 318/587 |
| 5,931,252 | 8/1999 | Shimizu et al. | 180/204 |
| 5,931,253 | 8/1999 | Shimizu et al. | 180/204 |
| 5,945,799 | 8/1999 | Shimizu | 318/587 |

FOREIGN PATENT DOCUMENTS

| | | |
|---|---|---|
| 3-74256 | 3/1991 | Japan . |
| 4-55168 | 2/1992 | Japan . |

*Primary Examiner*—Gary Chin
*Attorney, Agent, or Firm*—Nikaido Marmelstein Murray & Oram LLP

[57] ABSTRACT

When an automatic parking control operation is carried out, while allowing a vehicle to creep at a low speed, a net braking force applied to the vehicle is appropriately estimated. That is, not only a braking force generated by operation of a brake pedal but also a braking force generated due to an inclination or unevenness of a road surface or the like are taken into consideration. When the vehicle speed is, for example, in a range of 3 km/hr to 10 km/hr, it is determined that a suitable braking force has been generated for carrying out the automatic parking control operation. To bring the vehicle speed into the predetermined range, it is necessary a) to generate a braking force by operation of the brake pedal on a flat road, b) to generate a negative braking force (a driving force) by operation of an accelerator pedal on a steep ascending slope and c) to generate a larger braking force by operation of the brake pedal on a descending slope.

6 Claims, 4 Drawing Sheets

LOCUS OF BACKWARD MOVEMENT

LOCUS OF FORWARD MOVEMENT

AUTOMATIC STEERING APPARATUS FOR VEHICLES

DESCRIPTION OF THE INVENTION

1. Field of the Invention

The present invention relates to an automatic steering apparatus for a vehicle, to automatically park the vehicle without recourse to steering by a driver.

2. Background of the Invention

Automatic steering apparatuses for vehicles are already known from Japanese Patent Application Laid-open Nos. 3-74256 and 4-55168. These automatic steering apparatuses for vehicles utilize an actuator of a conventionally well-known electrically powered steering device, and are adapted to automatically carry out reverse parking and longitudinal parking of the vehicle by controlling the actuator based on the relationship between distance of movement of the vehicle and steering angle, which are stored in advance.

When the automatic parking operation is to be carried out in a vehicle equipped with an automatic transmission, it is necessary for a driver to operate a brake pedal to regulate the creeping speed of the vehicle to a speed suitable for an automatic parking operation. If the amount of operation of the brake pedal is equal to or lower than a reference value, which causes the creeping speed to become too high, the automatic parking control operation is discontinued. However, the correspondence between the amount of depression of the brake pedal and the creeping speed may be changed in some cases due to several factors such as inclination of a road surface, a difference in level between road surfaces, a variation in the number of idling rotations of an engine and the like. In such a case, it is difficult to appropriately determine whether the automatic parking control operation should be carried out or discontinued.

SUMMARY OF THE INVENTION

The present invention has been accomplished with the above circumstance in mind. It is an object of the present invention to appropriately estimate a net braking force applied to the vehicle, when the automatic parking control operation is carried out, while the vehicle is moving very slowly.

To achieve the above object, according to one embodiment of the present invention, there is provided an automatic steering apparatus for a vehicle, comprising a movement locus determining means for one of storing and calculating a locus of movement of the vehicle to a target position, an actuator for steering the wheels of the vehicle based on the locus of movement determined by the movement locus determining means, a braking force detecting means for detecting a braking force applied to the vehicle, and an actuator driving control means for driving the actuator when the detected braking force is in a predetermined range. The braking force detecting means detects a braking force applied to the vehicle based on a sum of a) a braking force generated by a brake input means operated by a driver and b) a braking force generated due to at least one factor other than the brake input means.

With the above arrangement, a net braking force can be appropriately estimated based on not only the braking force generated by the brake input means, but also the braking force generated due to several factors such as the inclination of a road surface, a difference in level between road surfaces, a variation in the number of idling rotations of an engine and the like. Therefore, it is possible to precisely drive the actuator by the actuator driving control means. The term "braking force in the predetermined range" is defined herein to be a braking force which allows a vehicle to have a creeping speed which is suitable for carrying out automatic parking control. The creeping speed is set in a range of 3 Km/hr to 10 km/hr in the embodiment, but the value thereof can be changed.

According to a modification of the present invention, the actuator driving control means determines that the braking force is in the predetermined range, when the vehicle speed is equal to or lower than a predetermined value.

With the above feature, it can be simply and reliably determined, by only detecting a vehicle speed and comparing this vehicle speed with the predetermined value, whether the braking force in the predetermined range is being applied to the vehicle. The term "predetermined value" is defined herein to be a creeping speed suitable for carrying out the automatic parking control operation, and is set in a range of 3 km/hr to 10 km/hr in the embodiment, but is not limited to this range.

According to a further modification of the present invention, the actuator driving control means determines that the braking force in the predetermined range is being applied until a predetermined time has lapsed from the point in time when the braking force in the predetermined range has stopped being applied to the vehicle.

With the above feature, whenever the braking force in the predetermined range has been temporarily stopped, the driving of the actuator by the actuator driving control means can be prevented from being discontinued. The predetermined time is defined herein to be a time during which the driver can regulate the braking force to a suitable value, and the value thereof is set at 2 seconds in the embodiment, but can be changed.

According to another modification of the present invention, the automatic steering apparatus further includes a warning means for warning a driver of the vehicle when the braking force in the predetermined range is not being applied to the vehicle.

With the above feature, it is possible to allow the driver to perceive the fact that the braking force in the predetermined range is not being applied to the vehicle, thereby urging the driver to regulate the braking force.

Other features and advantages will be described below.

DESCRIPTION OF THE DRAWINGS

The mode for carrying out the present invention will now be described by way of an embodiment shown in the accompanying drawings.

FIGS. 1 to 5 illustrate an embodiment of the present invention.

FIG. 1 is an illustration of the entire arrangement of a vehicle provided with a steering control unit;

FIG. 3 is a graph illustrating the relationship between the braking force and the vehicle speed;

FIG. 4 is a graph illustrating the relationship between the braking force generated due to an external factor and the braking force generated by the driver's operation; and FIG. 5 is an explanatory diagram corresponding to FIG. 4.

DESCRIPTION OF THE PREFERRED EMBODIMENTS

Figure 1:
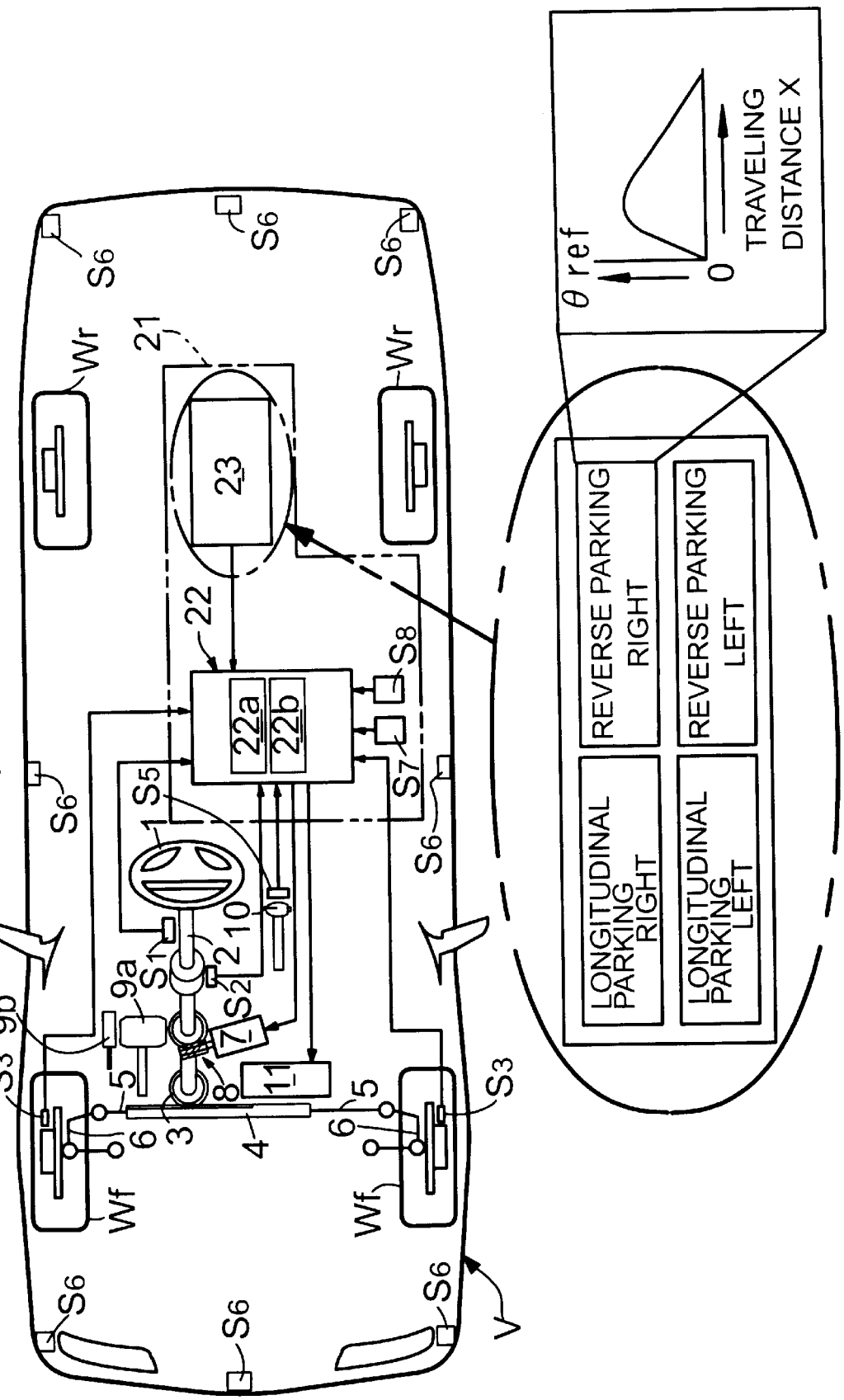

As shown in FIG. 1, a vehicle V includes a pair of front wheels Wf, Wf and a pair of rear wheels Wr, Wr. A steering wheel 1 and the front wheels Wf, Wf, which are steering wheels, are connected together via a steering shaft 2 which is rotated with the steering wheel 1. A pinion 3 is provided at a lower end portion of the steering shaft 2. A rack 4 is meshed with the pinion 3. Left and right tie rods 5, 5 are provided on ends of the rack 4, and left and right knuckles 6, 6 are linked to the tie rods 5, 5. To assist the driver's operation of the steering wheel 1, or to carry out an automatic steering operation for garaging of the vehicle (which will be described hereinafter), a steering actuator 7 comprising an electric motor is coupled to the steering shaft 2 via a worm gear mechanism 8.

A steering control unit 21 comprises a controller 22 and a storage means 23. The controller 22 is adapted to receive signals from a) a steering angle detecting means $S_1$ for detecting a steering angle θ of the front wheels Wf, Wf based on the angle of rotation of the steering wheel 1, b) a detection means $S_2$ for detecting a steering torque of the steering wheel 1, c) detector means $S_3$, $S_3$ for detecting angles of rotation of the left and right front wheels Wf, Wf, d) a shift range detecting means $S_5$ for detecting the shift range ("D" range, "R" range, "N" range, "P" range or the like) selected by a select lever 10, and e) eight object detecting means $S_6$ mounted at a front portion, a central portion and a rear portion of the vehicle V. The object detecting means $S_6$ may be any known sonar, radar, television camera or the like. Lines connecting the eight object detecting means $S_6$ and the controller 22 are omitted to simplify the drawings. The storage means 23 constitutes a movement locus setting means of the present invention.

A mode selecting switch $S_7$ operated by the driver and an automatic parking starting switch $S_8$ are also connected to the controller 22. The mode selecting switch $S_7$ is operated for selecting any one of four parking modes: a reverse-parking/right mode, a reverse-parking/left mode, a longitudinal parking/right mode, and a longitudinal parking/left mode. The mode selection switch $S_7$ includes four buttons which correspond to the four modes. The automatic parking starting switch $S_8$ is operated when an automatic parking operation is started in any mode selected by the mode selecting switch $S_7$.

Data for the four parking modes, i.e., the relationship between the traveling distance X of the vehicle V and standard steering angles θref, is stored as a table in advance in the storage means 23 as shown in FIG. 1. The traveling distance X of the vehicle V is determined by multiplying the already-known circumferential length of the front wheels Wf by the angle of rotation of the front wheels Wf detected by the front wheel rotational-angle detecting means $S_3$, $S_3$. To calculate the traveling distance X, a high selected value, a low selected value or an average value of two values calculated based on the outputs from the pair of left and right front wheel rotational angle detecting means $S_3$, $S_3$ is used.

The controller 22 includes a braking force detecting means 22a and an actuator driving control means 22b. The controller 22 controls the operation of the steering actuator 7 and the operation of an operation stage display device 11 including a liquid crystal monitor, a speaker, a lamp, a chime, a buzzer or the like, based on the signals from the detecting means $S_1$ to $S_3$, $S_5$ and $S_6$ and the switches $S_7$ and $S_8$, and the date for the parking modes stored in the storage means 23. The operational stage display device 11 constitutes a warning means according to the embodiment of the present invention.

The operation of the embodiment of the present invention having the above-described arrangement will be described below.

In a normal operation (the automatic parking starting switch $S_8$ is not on), i.e., when automatic parking operation is not carried out, the steering control unit 21 functions as a general power steering control unit. Specifically, when the driver operates the steering wheel 1 to turn the vehicle V, the steering torque detecting means $S_2$ detects the steering torque applied to the steering wheel 1, and the actuator driving control means 22b controls the driving of the steering actuator 7 based on the steering torque. As a result, the left and right front wheels Wf, Wf are steered by the driving force of the steering actuator 7, whereby the steering operation of the driver is assisted.

The contents of the automatic parking control operation will now be described taking as an example reverse parking/left mode (a mode in which the vehicle V is parked in a parking position which is on the left of the vehicle V, as the vehicle is moved backwards).

Figure 2A:
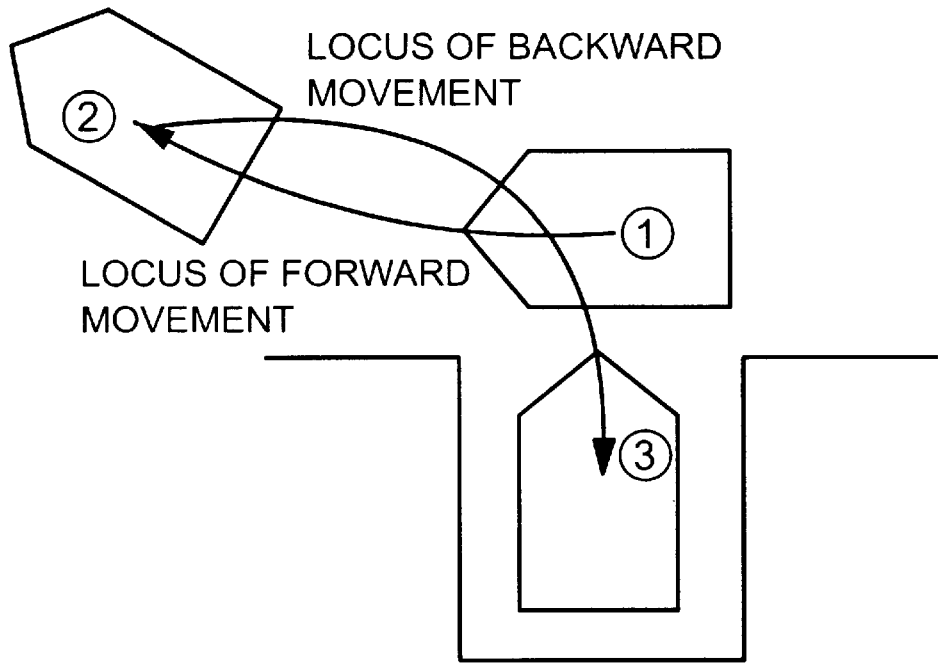
FIGS. 2A–2B are diagrams for explaining the operation in a reverse parking/left mode.

First, as shown in FIG. 2A, the vehicle V is moved to a position in a vicinity of a garage in which the vehicle V is to be parked. The vehicle is stopped in a position (the starting position (1)) in which a predetermined reference point (e.g., a left sideview mirror) is matched with a center line of the garage with the left side of the vehicle body as close as possible to an entrance line of the garage. Then, when the mode selecting switch $S_7$ is operated to select the reverse parking/left mode and the automatic parking starting switch $S_8$ is turned on, the automatic parking control operation is started. While the automatic parking control operation is carried out, the actual position of the subject vehicle, obstacles around the vehicle, the parking position, the predicted locus of movement of the vehicle from the starting position to the parking position, and a reversing position at which the forward movement of the vehicle is changed to the backward movement thereof, are displayed on a display of the operation stage display unit 11. Various kinds of instruction and alarms such as the operation of the selecting lever 10 and the like in the reversing position are given vocally from the speaker of the operation stage display unit 11 to the driver.

The automatic parking control operation ensures that the front wheels Wf, Wf are automatically steered based on data for reverse parking/left mode selected by the mode selecting switch $S_7$, only by releasing the brake pedal 9a (see FIG. 1) to permit the vehicle to creep at a slow speed, even if the driver does not operate the steering wheel 1. Namely, while the vehicle travels forward from the starting position (1) to the reversing position (2), the front wheels Wf, Wf are automatically steered rightwards. While the vehicle V travels backwards from the reversing position (2) to a parking-completion position (3), the front wheels Wf, Wf are automatically steered leftwards.

Figure 2B:
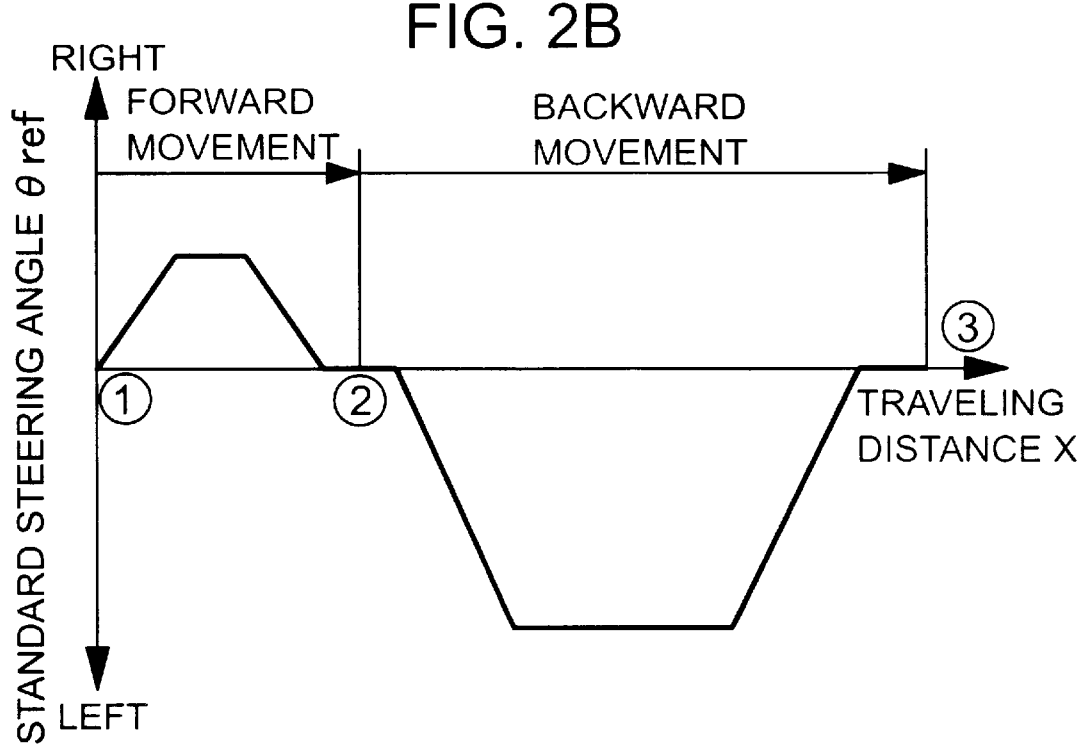

As shown in FIG. 2B, while the automatic steering operation is carried out, the actuator driving control means 22b calculates a deviation E (=θref−θ) based on the standard steering angle θref in the reverse parking/left mode which is read from storage means 23 and the steering angle θ input from the steering angle detecting means $S_1$. The operation of the steering actuator 7 is controlled so that the deviation E becomes zero. In this case, the standard steering angle θref is set to correspond to the traveling distance X of the vehicle V. Hence, even if the vehicle speed of the creeping vehicle is slightly varied, the vehicle V always travels along the above-described locus of movement.

The automatic parking control operation is usually carried out while the vehicle V creeps at a slow speed with the brake pedal 9a depressed by the driver. However, if the amount of depression of brake pedal 9a by driver is not large enough, the vehicle speed of the creeping vehicle may become too high in some cases. This will cause the response of the steering actuator 7 to be retarded, so that the vehicle does not travel along the predetermined locus of movement. If the amount of depression of brake pedal 9a by driver is too large, the vehicle speed of the creeping vehicle may become too low in some cases, causing the time required for the automatic parking operation to be prolonged.

Therefore, the braking force detecting means 22a of the controller 22 detects a net braking force applied to the vehicle V. If the braking force is outside of a predetermined range of the braking force in which an appropriate creeping vehicle speed (e.g., 3 km/hr to 10 km/hr) is provided, then the operation stage display device 11 is operated to warn the driver. As a result, if the driver regulates the braking force into the predetermining braking force range within a predetermined period of time (e.g., 2 seconds), the automatic parking control operation is continued based on the determination that the braking force is in the predetermined range during the predetermined period of time. If the regulation of the braking force is not carried out within the predetermined period of time, the automatic parking control operation is discontinued.

How the net braking force of the vehicle V is calculated by the braking force detecting means 22a of the controller 22 will be described below. The braking force used herein is not limited to the braking force generated by the depression of the brake pedal 9a, and includes the following braking forces: a braking force generated due to a road surface which is an ascending slope, a braking force generated when the vehicle travels across an unevenness in a road surface, and a braking force generated due to a reduced number of idling rotations of the engine resulting in a decreased creeping force being applied to the vehicle. If the braking forces applied in a direction to decelerate the vehicle V is defined as being positive braking forces, the following accelerating forces are considered negative braking forces: accelerating forces applied in a direction to accelerate the vehicle V, i.e., an accelerating force generated by the depression of the accelerator pedal 9b (see FIG. 1), an accelerating force generated due to a road surface which is a descending slope, and an accelerating force generated due to an increase in the number of idling rotations of the engine, resulting in an increased creeping force being applied to the vehicle.

These positive and negative braking forces are offset from each other. If the vehicle V travels forward at an appropriate creeping vehicle speed as a result of the offsetting, a braking force has been generated which is in the predetermined range. Namely, the vehicle speed is detected in the braking force detecting means 22a based on outputs from the left and right front wheel rotation-number detecting means $S_3$, $S_3$. If the vehicle speed is in the appropriate range of creeping vehicle speed (3 km/hr to 10 km/hr), the automatic parking control operation is determined to be feasible. If the automatic parking control operation is determined to be feasible based on the vehicle speed, factors such as the inclination of a road surface, the unevenness of a road surface, a variation in the number of idling rotations of the engine and the like can be eliminated to carry out a precise determination.

The above-described operation will be further described in detail with reference to the drawings.

Figure 3:
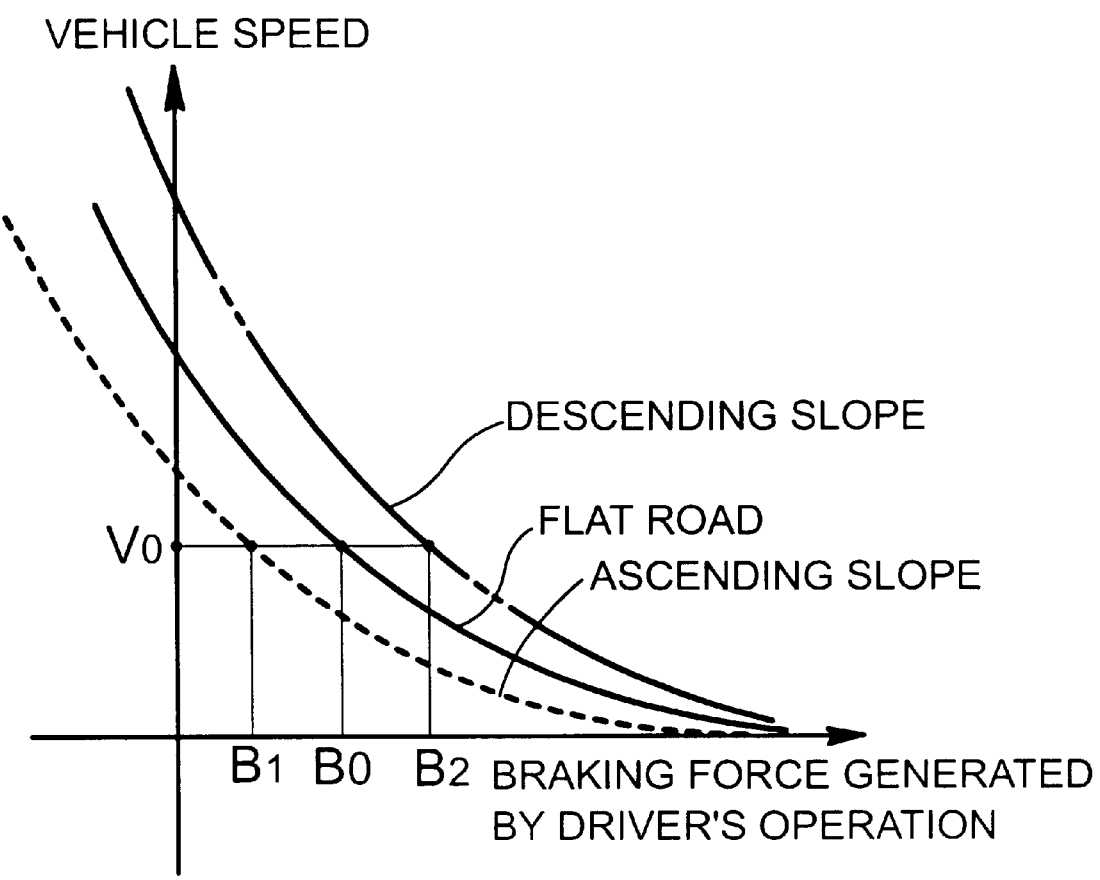

FIG. 3 is a graph showing the braking force generated by the operation of the brake pedal 9a on the abscissa and the vehicle speed on the ordinate. A solid line, a dotted line and a dashed line indicate characteristics on a flat road, an ascending slope and a descending slope, respectively. Since the vehicle speed is decreased due to the force of gravity on the ascending slope, the characteristic (indicated by the dotted line) on the ascending slope lies below the characteristic (indicated by the solid line) on the flat road. Since the vehicle speed is increased due to the force of gravity on the descending slope, the characteristic (indicated by the dashed line) on the descending slope lies above the characteristic (indicated by the solid line) on the flat road.

Therefore, if it is assumed that it is necessary to operate the brake pedal 9a on a flat road to generate a braking force $B_0$ in order to provide a creeping vehicle speed $V_0$ suitable for the automatic parking control operation, it is necessary on an ascending slope to generate a braking force $B_1$ which is smaller than the braking force $B_0$, and it is necessary on a descending slope to generate a braking force $B_2$ which is larger than the braking force $B_0$.

Figure 4:
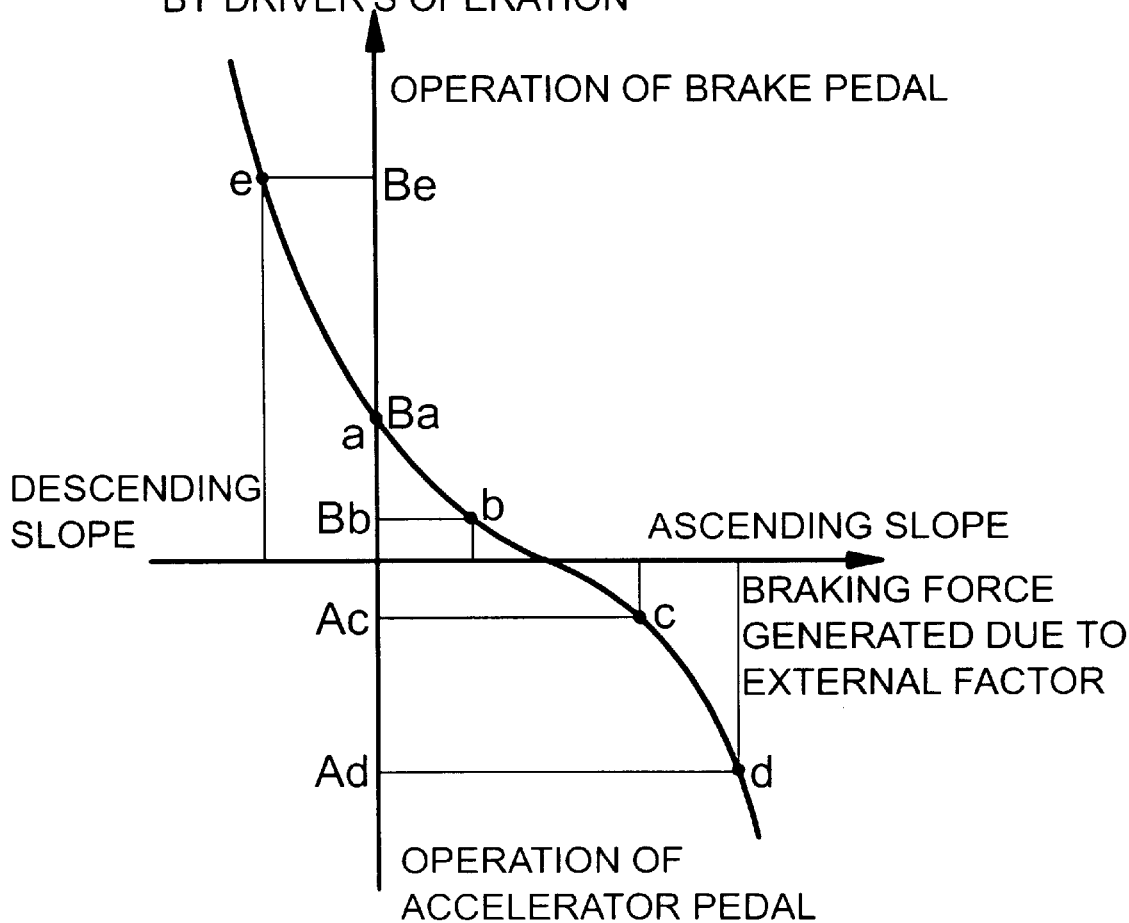

When the ascending slope is steep, it may be necessary in some cases to operate the accelerator pedal 9b to generate a negative braking force in order to provide an appropriate creeping vehicle speed. FIG. 4 is a graph showing the positive and negative braking forces generated on the ascending or descending slope on the abscissa and the positive and negative braking forces generated by operating the brake pedal 9a or the accelerator pedal 9b on the ordinate. An S-shaped characteristic line indicates a set of points in which an appropriate creeping vehicle speed is provided. Points a to a on the characteristic line correspond to section A to E of the road surface in FIG. 5.

Figure 5:
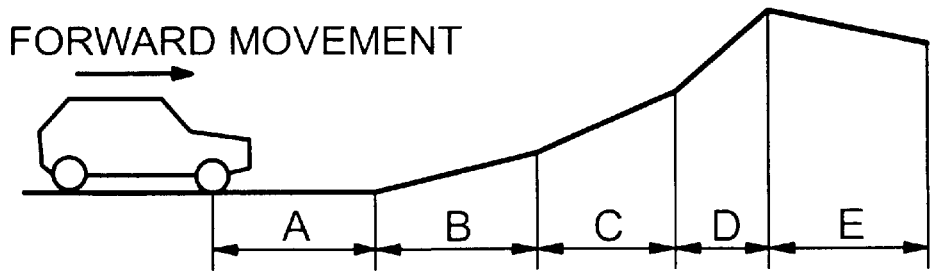

The point a in FIG. 4 corresponds to the vehicle V traveling on the flat section A in FIG. 5. To provide an appropriate creeping vehicle speed during this time, it is necessary to operate the brake pedal 9a to generate a positive braking force Ba. The section B, which is a gentle ascending slope, corresponds to a point b in FIG. 4. Since the positive braking force is generated due to the ascending slope, the positive braking force to be generated by the operation of the brake pedal 9a is decreased to Bb. The sections C and D, which are an ascending slope having a medium inclination and a steep inclination, correspond to the points c and d in FIG. 4, respectively. Since an appropriate creeping vehicle speed can not be maintained by the operation of the brake pedal 9a due to the positive braking force generated due to the ascending slope, it is necessary to operate the accelerator pedal 9b to generate negative braking forces Ac and Ad. The section E which is a descending slope corresponds to the point e in FIG. 4. To offset the negative braking force due to the descending slope, it is necessary to generate a large positive braking force Be by the operation of the brake pedal 9a.

In this way, it is determined whether the automatic parking control operation is appropriate, in consideration of not only the braking force generated by the operation of the brake pedal 9a, but also the braking force generated due to factors other than the operation of the brake pedal 9a. Therefore, the proper automatic parking control operation can be carried out irrespective of the inclination and unevenness of the road surface.

The locus of movement of the vehicle V to the target position has been stored in advance in the storage means 23 in the embodiment, but may be calculated from the actual position and target position of the vehicle V. In addition, in providing a warning to the driver when the detected braking force is outside the predetermined braking force range, if the contents of the warning is changed depending upon whether the detected braking force is generated within the predetermined period of time during which the automatic parking control operation is continued, and after the lapse of the predetermined period of time at which the automatic parking control operation is discontinued, the driver can precisely perceive the situation of the vehicle. The vehicle speed range at which the automatic parking control operation is carried out is between 3 km/hr, which is the lower limit value, and 10 km/hr, which is the upper limit value in the embodiment. However, the lower limit value of the vehicle speed may be not provided when the driver carries out the parking of the vehicle at an extremely low speed in a very narrow area, while paying sufficient attention to the surroundings.

As discussed above, according to the first embodiment of the present invention, the braking force for determining whether the actuator can be driven, is based on the sum of a) the braking force generated by the brake input means operated by the driver and b) the braking force generated due to factors other than the brake input means. Therefore, the net braking force can be appropriately estimated in consideration of not only the braking force generated by the brake input means operated by the driver but also the braking force generated due to factors other than the brake input means, thereby precisely carrying out the driving of the actuator by the actuator driving control means.

According to a modification of the present invention, the actuator driving control means determines that the braking force is in the above-described predetermined range when the vehicle speed is equal to or lower than the predetermined value. Therefore, it is possible to simply and reliably determine whether the braking force is in the predetermined range, by detecting only the vehicle speed and comparing it with the predetermined value.

According to another modification of the present invention, the actuator driving control means determines that the braking force in the predetermined range is being applied to the vehicle until the predetermined time is lapsed from the point in time when the braking force in the predetermined range has stopped being applied to the vehicle. Therefore, it is possible to prevent driving of the actuator by the actuator driving control means from being discontinued whenever the braking force in the predetermined range is temporarily stopped being applied to the vehicle.

According to a further modification of the present invention, the automatic steering apparatus includes a warning means for warning when the barking force is determined to be outside the predetermined range. Thus, excess and deficiency of the braking force can be perceived by the driver by urging the driver to regulate the braking force.

Although the embodiment of the present invention has been described in detail, it will be understood that the present invention is not limited to the above-described embodiment, and various modifications may be made without departing from the subject matter of the present invention.

What is claimed is:

1. An automatic steering apparatus for a vehicle, comprising:

a movement locus determining means for one of storing and calculating a locus of movement of the vehicle to a target position;

an actuator for steering wheels of the vehicle based on the locus of movement determined by said movement locus determining means;

a braking force detecting means for detecting a braking force applied to the vehicle; and an actuator driving control means for driving said actuator when the detected braking force is within a predetermined range, wherein said braking force detecting means detects a braking force applied to the vehicle based on a sum of a braking force generated by a brake input means operated by a driver and a braking force generated due to at least one factor other than the braking input means.

2. An automatic steering apparatus for a vehicle according to claim 1, wherein said actuator driving control means determines that the braking force is in said predetermined range when a vehicle speed is one of equal to and lower than a predetermined value.

3. An automatic steering apparatus for a vehicle according to claim 2, wherein said actuator driving control means determines that the braking force in said predetermined range is being applied until a predetermined time is lapsed from a point in time when the braking force in said predetermined range has stopped being applied to the vehicle.

4. An automatic steering apparatus for a vehicle according to claim 1, further including a warning means for warning a driver of the vehicle when the braking force in said predetermined range is not being applied to the vehicle.

5. An automatic steering apparatus for a vehicle according to claim 2, further including a warning means for warning a driver of the vehicle when the braking force in said predetermined range is not being applied to the vehicle.

6. An automatic steering apparatus for a vehicle according to claim 3, further including a warning means for warning a driver of the vehicle when the braking force in said predetermined range is not being applied to the vehicle.

* * * * *